United States Patent

Cupler, II

[15] 3,663,998

[45] May 23, 1972

[54] APPARATUS FOR CONDUCTING MACHINING OPERATIONS

[72] Inventor: John A. Cupler, II, 10 Cupler Dr., LaVale, Cumberland, Md. 25102

[22] Filed: Oct. 22, 1969

[21] Appl. No.: 868,517

Related U.S. Application Data

[63] Continuation-in-part of Ser. No. 715,711, Mar. 25, 1968, Pat. No. 3,478,419.

[52] U.S. Cl. ...................................29/26 A, 29/568, 408/31, 408/35
[51] Int. Cl. .......................................................B23q 3/157
[58] Field of Search .................29/26 A, 568; 77/64; 408/35, 408/31

[56] References Cited

UNITED STATES PATENTS

| | | |
|---|---|---|
| 3,249,997 | 5/1966 | Hutchens..................................29/568 |
| 3,281,935 | 11/1966 | Zankl et al................................29/568 |
| 2,452,089 | 10/1948 | Wiken et al............................77/64 X |
| 2,439,965 | 4/1948 | Cupler........................................77/64 |
| 3,478,419 | 11/1969 | Cupler.....................................29/568 |

Primary Examiner—Andrew R. Juhasz
Assistant Examiner—Z. R. Bilinsky
Attorney—Colton & Stone

[57] ABSTRACT

The disclosure is directed to a vertically oriented automatic tool changer employing non-captive tools for performing machining and/or assembly operations at a plurality of work locations on a single workpiece which workpiece is supported by a work positioner capable of infinite adjustment to present any desired number an spacing of work locations, on the workpiece, to the working axis of the non-captive tools.

14 Claims, 20 Drawing Figures

FIG. 1

INVENTOR
JOHN A. CUPLER, II
BY Colton + Stone
ATTORNEYS.

INVENTOR
JOHN A. CUPLER, II

BY Colton + Stone

ATTORNEYS.

FIG. 9

Patented May 23, 1972

INVENTOR
JOHN A. CUPLER, II

BY Colton + Stone

ATTORNEYS.

Patented May 23, 1972

INVENTOR
JOHN A. CUPLER, II

BY Colton + Stone

ATTORNEYS.

3,663,998

APPARATUS FOR CONDUCTING MACHINING OPERATIONS

CROSS-REFERENCE TO RELATED APPLICATION

This is a continuation-in-part of copending application Ser. No. 715,711 filed Mar. 25, 1968, now U.S. Pat. No. 3,478,419.

BACKGROUND OF THE INVENTION

The concept of an automatic tool changer employing non-captive tools was introduced by the disclosure in the aforesaid copending application which is directed primarily to horizontal tool changers, i.e. those wherein the tool interchange is effected and machining operations conducted with the tools horizontally disposed. One great advantage in the horizontal tool changer is the advantageous usage of gravity in the tool storage and interchange operation since no restraint need be imposed upon the tools to insure their proper storage rack positioning prior to and during the movements undergone thereby during the tool interchange portion of a machining cycle. Similarly, the correct placement of a non-captive tool on its open bearing support is assured through gravity alone as will be apparent from an inspection of the disclosure in the aforesaid application.

In many machining operations and particularly those conducted on large, heavy or otherwise cumbersome workpieces it is more advantageous to support the workpiece vertically below the working tool rather than at the same horizontal level therewith as is necessary in a horizontal tool changer. The desirability of vertical rather than horizontal alignment of the working tool and workpiece is even more pronounced where a number of machining operations are to be conducted at each of a plurality of work locations on the same workpiece since three dimensional or other complex positioning movements may be more readily imparted to a workpiece whose stable position is enhanced by gravity rather than being mounted on a suspended support generally in the manner required for a horizontal tool changer. Furthermore, high precision workpiece positioning may be more efficaciously achieved utilizing known techniques established over the years in conjunction with machining equipment employing vertical tool infeed mechanisms. Although the prior art has not previously enjoyed the infinite workpiece positioning control which is described and claimed herein the same is, nevertheless, more adaptable for usage with a vertically rather than horizontally disposed tool changer for the reasons enumerated above.

The infinite workpiece positioning control is, of course, of generally recognized desirability in any precision machining equipment however the same assumes new proportions when used in conjunction with an automatic tool changer of the type herein described. Exemplary of the manner in which a complex positioning control and automatic tool changer may be utilized to perform machining operations which were previously impractical, if not impossible, is the drilling of multiple fluid cooling holes in gas turbine blades and vanes. Such blades and vanes are fabricated from space age alloys exhibiting the greatest metallurgical toughness and hardness known to man. The drilling of such fluid cooling holes having diameters in the range below 0.040 inch, for example, requires the use of drills of such size that the same can withstand only limited lateral deflections without breakage. Additionally, because of the compound surfaces of curvature necessarily associated with such blades and vanes it is required that many if not all of the holes penetrate these surfaces at an angle. As clearly explained in applicant's copending application Ser. No. 786,344 filed Oct. 23, 1968, now U.S. Pat. No. 3,570,330 the infeeding of a drill relative to an inclined work surface produces a tendency in the drill to "walk" along the inclined surfaces which imposes substantial lateral forces on the drill which cannot be withstood by microdrills of the type utilized in the machining of fluid cooling holes in blades and vanes.

This problem may be overcome by the method of drilling known as Progressive Step Tool Change introduced by the disclosure in the last mentioned copending application wherein a short stubby end mill having a proportionately great resistance to lateral deflection is employed to initially penetrate the work surface with a blind bore and a plurality of successively larger tools are subsequently employed to extend the bore until break-through is achieved. The economic feasibility of this method of drilling is dependent on a fast interchange of tools which may be readily accomplished by herein disclosed machining center. Economic considerations further dictate the necessity of fast and accurate workpiece repositioning in conjunction with a rapid tool interchange. This may be more readily appreciated when one considers the complex configuration of a gas turbine blade or vane and the great multiplicity of holes that must be drilled therein at varying degrees of inclination to the workpiece surface. Since alloys of the aforementioned type are virtually unmachinable by microdrills except by a progressive step tool change and because of the great number of holes that must be drilled in each blade or vane; micro-mechanical machining of such fluid cooling holes are simply not practicable without a very rapid tool change cycle coupled with workpiece positioning apparatus capable of being programmed for automatic, infinite positioning adjustment. It is, additionally, desirable in many instances to utilize a tool changer to perform both machining and assembly operations which assembly operations will, in most cases, be facilitated by a vertical disposition of the working tool and workpiece whereby gravity may be advantageously utilized in the assembly operations.

SUMMARY OF THE INVENTION

The invention is directed to an automatic tool changer employing non-captive tools which may be interchanged between non-working and working positions during a time interval of from less than 1 second to 3 seconds depending on the size tools involved. A non-captive tool is herein defined as one which may undergo bodily movement, transversely of its own axis, relative to both the tool bearing structure which supports the tool in working position and a tool support structure which supports the tool in a non-working position adjacent the bearing structure. The tool driving means runs continually and constitutes the only restraint against the aforesaid bodily movement at that time during which the tool is actually working. Accordingly, removal of the tool driving means from engagement with the tool frees the same for bodily transverse movement which movement may be, advantageously, integrated with the movement of the tool driving means out of engagement with the tool.

The tool changer may be either semi-automatically controlled or completely automated under tape controlled or digital programming.

The contrast between actual performances of the tool changer herein described and known tool changers, as regards overall speed of operation and accuracy of control, is such as to render present day tool changer principles obsolete.

The word "tool," as used herein, refers not only to the actual tool itself, such as a drill, but also to the spindle on which the same is carried. It will be apparent that the working tool portion, itself, could be formed separately and mounted on the spindle or formed integrally therewith.

The tool changer, according to the invention, is provided with a vertically arranged outwardly opening Vee bearing that is positioned by a stop adjacent a work station for non-captively supporting a spindle mounted tool thereon for combined rotary and reciprocating motion relative thereto. The fact that the tool bearing is positioned against the stop in a working position, eliminates the introduction of any error in positioning a new tool in coaxial alignment with the working position of a previous tool based on the tool support bearing itself. Thus, if the tool spindle diameters of a plurality of tools are equal, their sequential placement in the same Vee bearing insures their positioning along the same axis as contrasted to the case of chucked tools wherein not only the tools but also either their chucks or the workpiece are moved relative to the work during each tool changing cycle.

A particularly desirable type machining operation requiring extreme accuracy of positioning that is virtually impossible to achieve without utilizing the principles herein disclosed is the machining of a single hole having varying diameters relative to a common center line. Thus, in making a synthetic yarn spinnerette, for example, where a countersink bore of relatively large diameter is to extend part way through the workpiece and the bore is to be continued through the workpiece with a much smaller bore; it is critical that the smaller bore be precisely on centerline with the larger bore to insure that the intersection of the two bores occurs in precise symmetrical relationship to the deepest penetration of the countersink portion of the larger bore.

Additionally, in order to change the work centerline it is only necessary to substitute a tool having a spindle whose diameter differs from that of a previous tool by a known amount. Accordingly, the necessity for repositioning a chuck or a workpiece during a working cycle is eliminated along with the errors inherent in such a repositioning operation. The spindles themselves, having been previously machined to known diameters within known tolerances, thus provide a most attractive and expeditious manner of changing working centerlines in an accurate manner merely by manually or automatically substituting one tool for another.

The Vee bearing supports the tool spindle adjacent an intermediate portion thereof and the outer ends of the tool spindle extend beyond the longitudinal confines of the bearing. The function of this relationship of parts is two-fold; first, each tool spindle extends for enough beyond the ends of the bearing, axially of the spindle, to permit axial reciprocation of the tool spindle relative to the bearing and; secondly, the unsupported ends of the spindle may be engaged by a support rack moving laterally, or outwardly relative to the bearing, to remove the tool from the bearing. Conversely, inward movement of the support rack relative to the bearing results in a tool being removed from the rack by the bearing whereupon such tool is positioned coaxially with the position of the tool previously supported on the bearing.

The infinitely variable work positioner includes five precise adjusting motors for providing three dimensional linear movement of the workpiece and, additionally, rotational adjustment about mutually perpendicular axes. In addition to the usage of such precise positioning control for use in machining complex configured articles, such as discussed above, a multitude of machining operations not previously considered to be practicable with existing equipment are routinely performed by the machining center herein described. Exemplary of such additional advantages in the precise workpiece position control is the manufacture of spinnerettes to produce trifil or three lobed filaments which requires the drilling of multiple divergent or parallel holes from a common entrance bore.

Encompassed by the invention is a new concept in manufacturing techniques; the utilization of a single machining center to perform both machining and assembly operations on a single workpiece along a common working axis wherein both the machining and assembly tools utilize a common drive and infeed.

DESCRIPTION OF THE PREFERRED EMBODIMENTS

Figure 1:
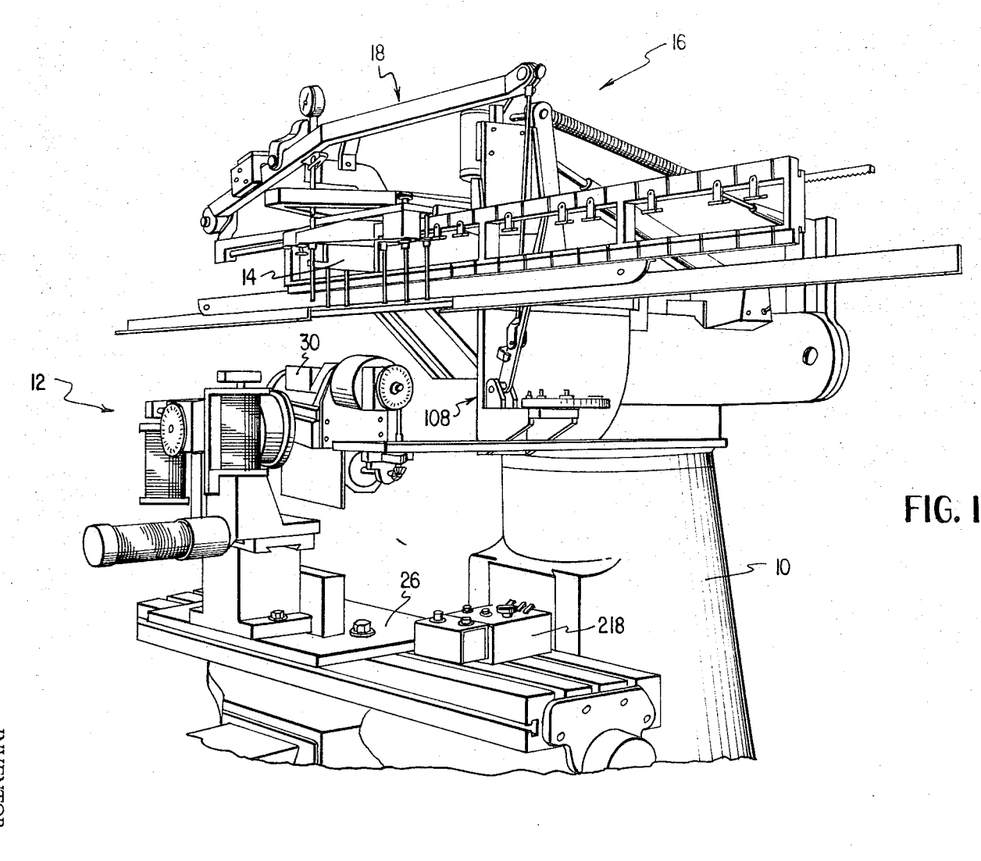
FIG. 1 is a perspective view of the machining center with a portion of the support structure therefor broken away.
Figure 9:
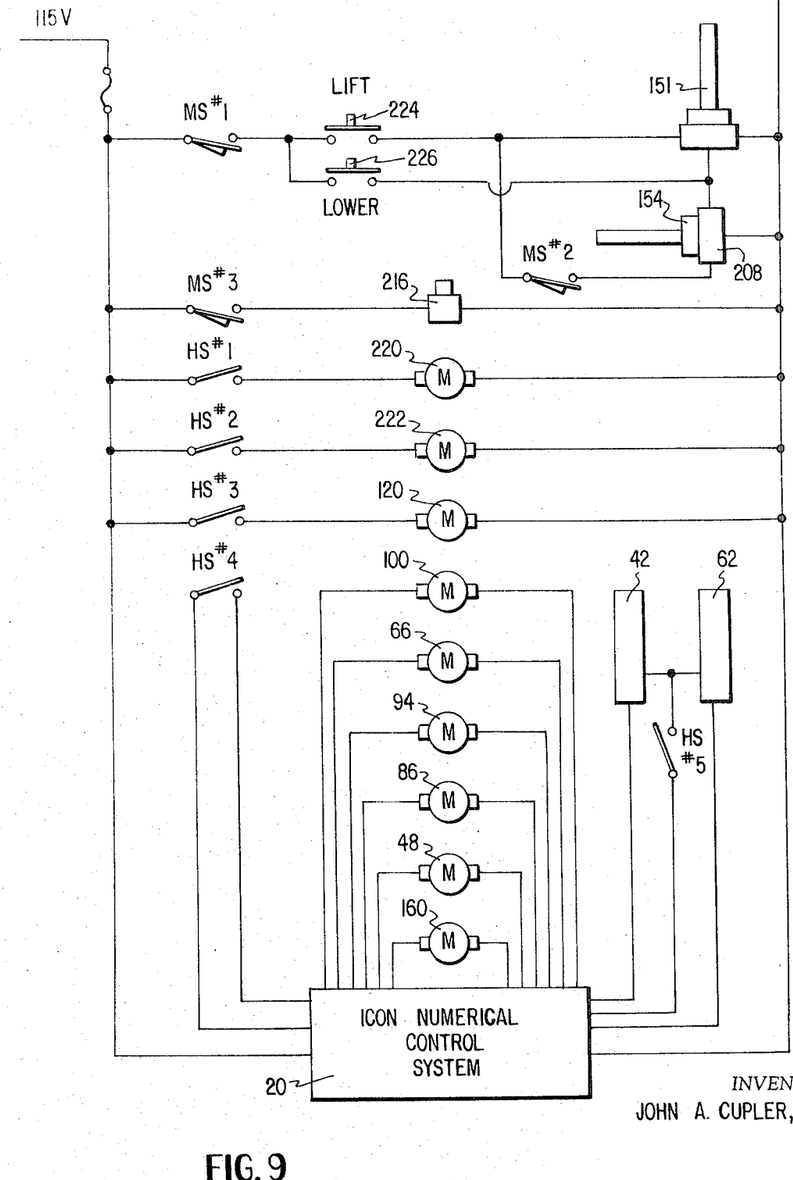
FIG. 9 is a diagrammatic illustration of the control circuitry.

The machining center, illustrated in its entirety in FIG. 1, includes a conventional base support structure 10, a work positioning station 12, tool bearing 14, a tool change and driving mechanism 16, a manual tool infeed linkage 18, and control circuitry including a numerical control unit 20 schematically illustrated in FIG. 9. Base support structure 10 comprises no part of the present invention and is herein illustrated as a model BRJ Bridgeport turret miller with the conventional head attachment removed.

WORK POSITIONING STATION

Figure 2:
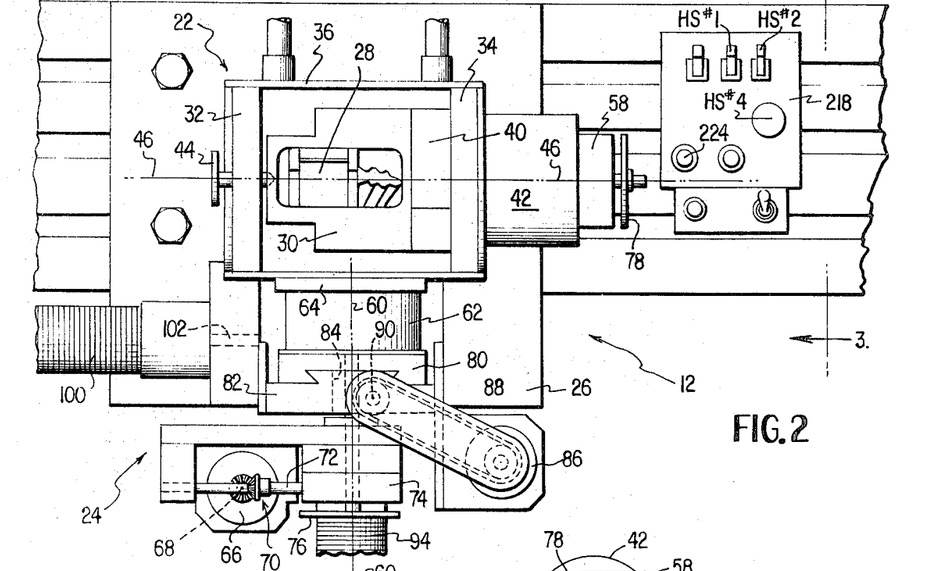
FIG. 2 is a top plan view of the work positioning station.

Work positioning station 12 includes work station 22 and work station positioning mechanism 24 positioned on a support bracket 26 carried by the table of base support structure 10. A turbine vane 28 is illustrated in FIG. 2 as being fixedly mounted in work holder 30, in any desired manner, for compound movements relative to a machining tool under the influence of a plurality of stepper or pulse motors as will be hereinafter more fully described.

Work holder 30 is adjustably supported between the upstanding ends 32, 34 of a coolant collecting and drain receptacle 36 which is fixedly secured to motor support bracket plate 38. Work holder 30 is removably secured to work holder adjusting bracket 40 by machine screws or the like which work holder adjusting bracket is mounted for precise, stepped rotational movement about the axis of the output shaft, not shown, of electric brake 42. Electric brake 42 is fixedly mounted to the outside wall of upstanding end 34 of receptacle 36. The output shaft of the electric brake extends through a journal bearing in the receptacle end wall and is secured to work holder adjusting bracket 40. A pointed adjusting screw 44 extends through the other receptacle end wall 32 in axial alignment with the output shaft of brake 42 to define an axis of rotation 46 about which the work holder may be rotationally adjusted when the point of screw 44 is tightly engaged with that end of the work holder remote from the brake 42. Stepper motor 48 secured to the undersurface of bracket plate 38 through motor housing 50 imparts the aforesaid precise, stepped rotational adjustment to work holder adjusting bracket 40 and its related work holder through output shaft 52, bevel gearing 54, shaft 56, gear box 58 and electric brake 42.

Figure 3:
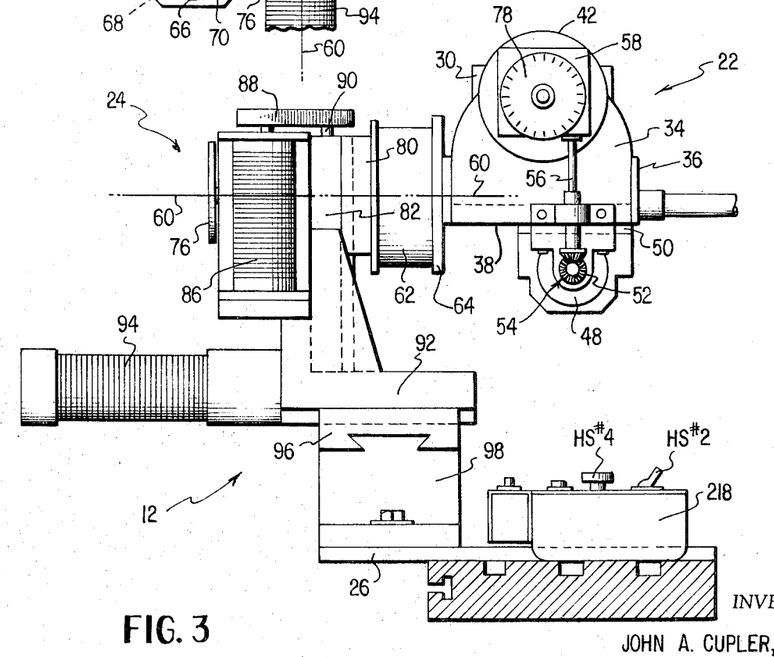
FIG. 3 is a sectional view taken along line 3—3 of FIG. 2.

The entire work station, including receptacle 36 and work holder 30, are further rotationally adjustable about an axis 60 arranged perpendicularly to axis 46 and defined by the output shaft (not shown) of electric brake 62 which output shaft is secured to a plate 64 mounted to one side wall of receptacle 36. Precise, stepped rotational adjustment about axis 60 is imparted to receptacle 36, supporting work holder 30, by stepper motor 66, output shaft 68, bevel gearing 70, shaft 72, gear box 74 and the gear box output shaft driving through electric brake 62. Indicators 76 and 78, respectively mounted on extensions of the gear box output shafts, provide a visual indication of these rotational adjustments about axes 60 and 46. Electric brake 62, motor 66 and gear box 74 are carried on Z positioning slide 80 vertically adjustable on relatively fixed way 82 which way is slotted at 84 for the reception of the output shaft of gear box 74 driving electric brake 62. Stepped vertical adjustment is imparted to slide 80 by stepper motor 86 whose output shaft drives a sprocket chain in chain housing 88 which chain is trained about a sprocket fixed to the upper end of slide adjusting screw 90. Slide way 82 is mounted on Y slide 92 for horizontal Y positioning movements therewith which are directly imparted thereto by stepper motor 94 whose output shaft is threaded and constitutes the lead screw for adjusting Y slide 92 on its way 96. Way 96 is also formed as an X positioning slide moving in its relatively fixed way 98 under the influence of stepper motor 100 and its output lead screw 102.

Although the aforedescribed five adjustments of the work holder (rotational adjustments about mutually perpendicular axes and three dimensional linear adjustment) will be sufficient to properly position a workpiece for most machining operations it will be apparent that three additional adjustments, in the nature of a coarse positioning operation, through the conventional X, Y, Z positioning mechanism of the Bridgeport support structure 10, may be effected as required.

THE TOOL BEARING

Bearing 14 may be a conventional jewel Vee bearing of the type manufactured by National Jet Company, Cumberland, Maryland or the same may be any other desired type non-captive bearing such as, for example, open bearings having a generally semi-circular configuration when viewed in the direction of the tool axis supported thereon.

TOOL CHANGE AND DRIVING MECHANISM

The Bridgeport cross-arm or ram 104 is fitted with a fixed shaft 106 extending therethrough on the extended ends of which is journalled the tool change table 108 having a generally Z shaped configuration and on which is mounted the tool change and driving mechanism 16 as well as the manual tool infeed linkage 18.

A tool rack positioner assembly 114 is mounted for controlled reciprocal movement on parallel shafts 116, secured to tool change table 108, through the intermediary of bearings 118. Bearings 118 are commercially available linear motion assembly bearings manufactured by SKF under designation SS 7410. These bearings preclude any relative motion between the tool rack positioner assembly and shafts 116 except one dimensional linear motion. The use of such bearings are desirable for the purpose of insuring registry of the various tools and their placement rack supporting recesses as will become apparent as the description proceeds.

Figure 8:
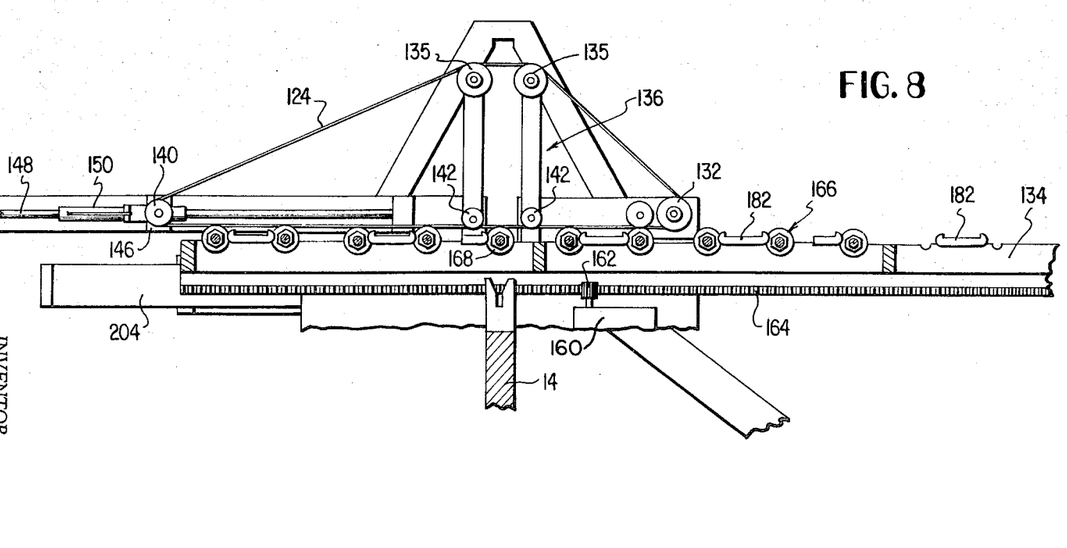
FIG. 8 is a view similar to FIG. 7 showing the relationship of parts during a tool change operation.

A drill motor 120 is secured to a bracket 122 upstanding from the tool rack positioner assembly and drives a recirculating tool drive belt 124 through the intermediary of belt 126, pulley 128, shaft 130 and tool drive belt pulley 132. In the non-working position of the tools when all of the tools are supported in their respective positions on the drill placement rack 134 and the rack is in the raised, extended position as will be subsequently explained, the tool drive belt assumes a generally triangular configuration as will be apparent from an inspection of FIG. 8. Thus, tool drive belt 124 extends from driving pulley 132 forwardly around idler pulleys 135 positioned one each on the forward ends of a fork structure 136 defined by two arms 138 extending forwardly from the rack positioner assembly on either side of Vee bearing 14. From idlers 135, the belt is trained about tensioning pulley 140 and returns to driving pulley 132 after passing behind idlers 142 located at the rearward ends of fork structure 136. Tensioning pulley 140 is biased in a direction away from driving pulley 132 by a spring reel 144 connected to pulley support bracket 146 which is mounted on rod 148 for reciprocal movement through sleeve bearing 150.

Figure 5:
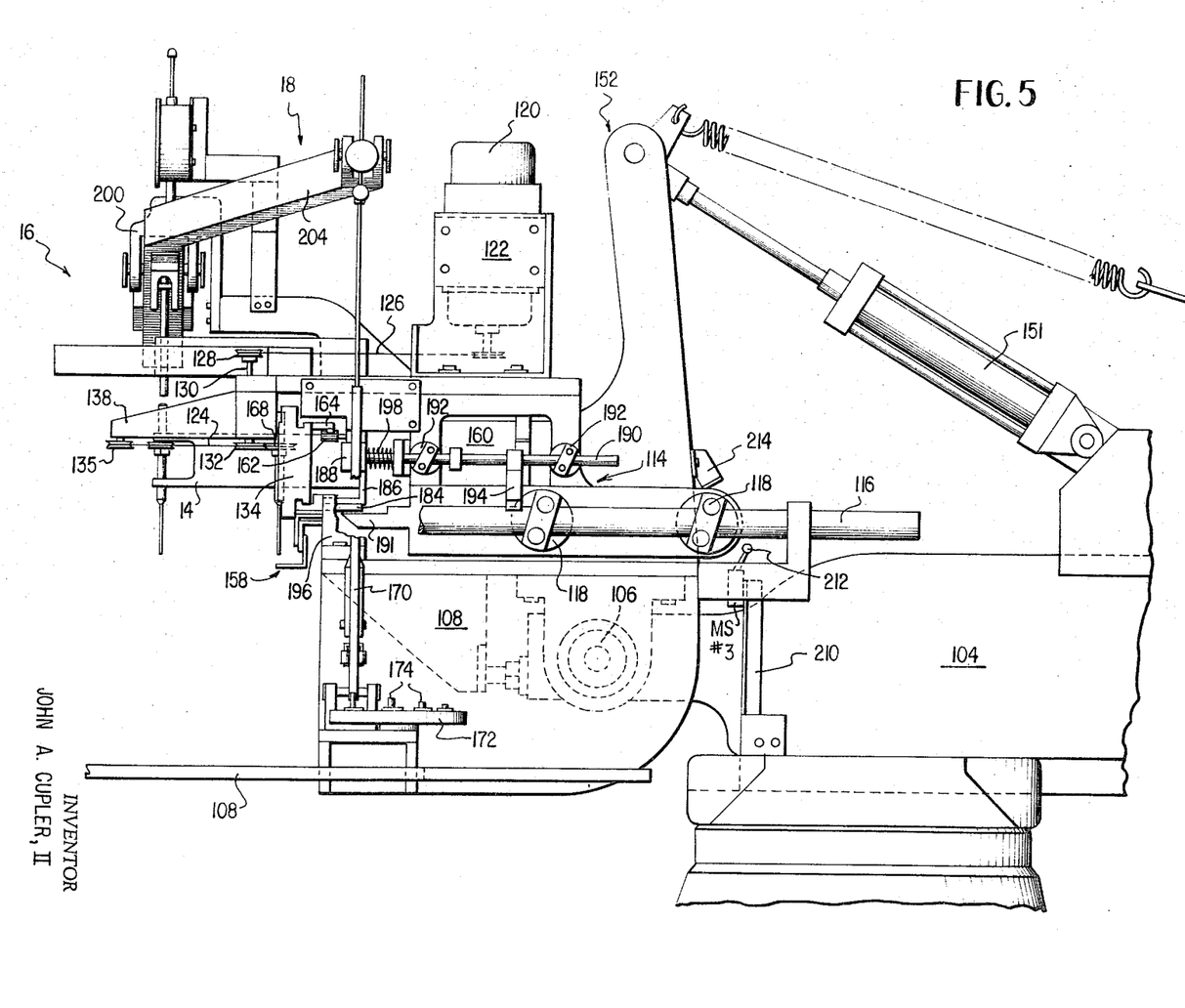
FIG. 5 is a side elevational view of the tool change table in working position as viewed from the right side of FIG. 1.
Figure 6:
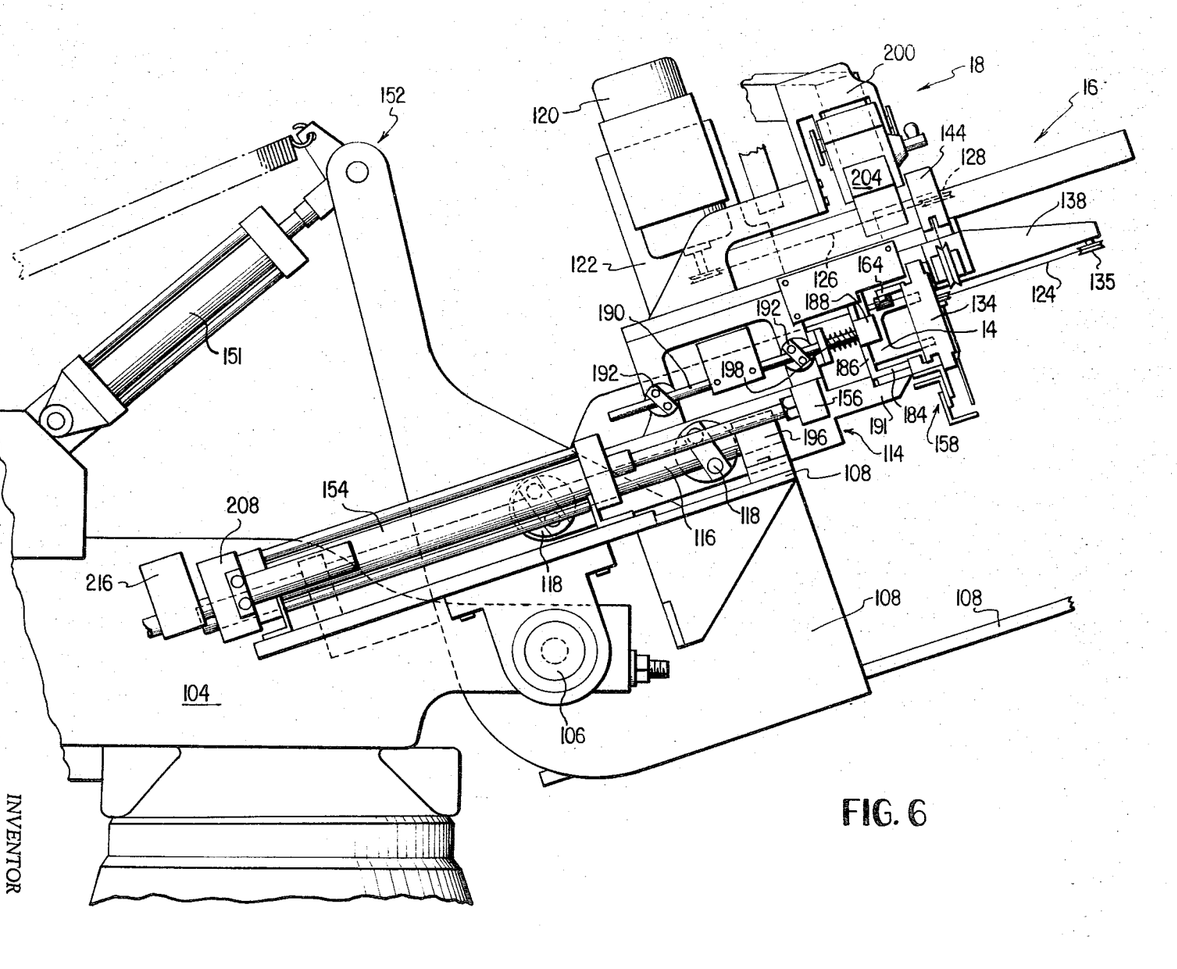
FIG. 6 is a side elevational view of the tool change table in a tool change position as it would appear when viewed from the left side of FIG. 1.

Tool change table 108 is tiltable between the working and non-working positions shown in FIGS. 5 and 6 about the axis of shaft 106 by lift air motor 151 interconnected between the Bridgeport cross-arm 104 and mast structure 152 upstanding from the table. A rack positioning air motor 154 has its cylinder mounted on the tool change table and its piston connected to a bracket 156 rigid with the tool rack positioner assembly 114 for reciprocating the same between the extended position shown in FIGS. 6 and 8 and the retracted, or working, position shown in FIGS. 5 and 7.

Drill placement rack 134 is mounted for controlled reciprocal linear movement on drill placement rack track assembly 158 through the intermediary of bearing assemblies, not shown. The drill placement rack may be linearly adjusted by pulse motor 160 driving pinion 162 engaging a rack 164 secured to the placement rack.

Figure 7:
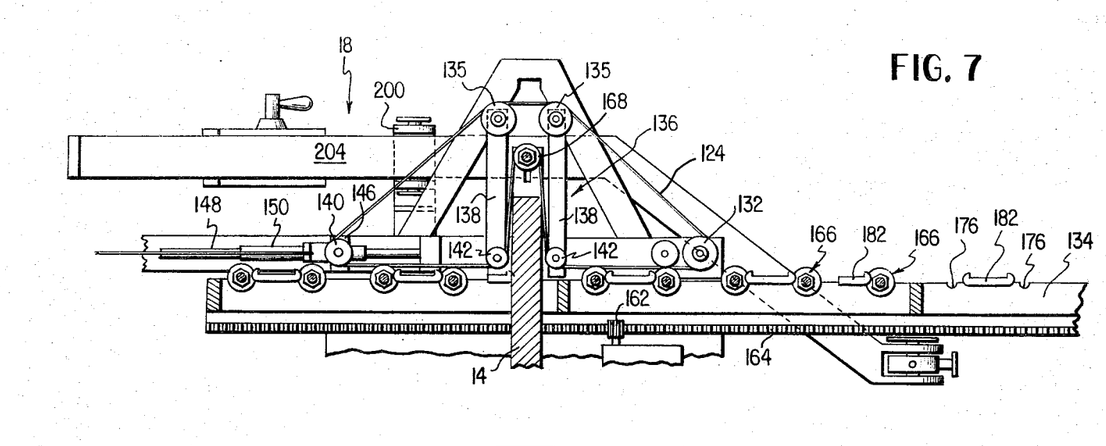
FIG. 7 is a sectional view taken along line 7—7 of FIG. 4.

The purpose of the relative fore and aft movement of tool change table 108 and tool rack positioner assembly 114 is to effect a tool interchange between Vee bearing 14 and the drill placement rack while, concomitantly, engaging or disengaging tool drive belt 124 with a selected working tool. Thus, as the tool positioner assembly 114 moves rearwardly from the position shown in FIG. 8 wherein the tool driving belt 124 presents a generally triangular configuration, Vee bearing 14 which is supported on change table 108 engages the rearwardly moving tool 166 aligned therewith. Further rearward movement of the tool positioner assembly carries the rear fork structure idler rollers 142 rearwardly of the Vee bearing on either side thereof thereby training the portion of tool drive belt therebetween about tool driving pulley 168 as shown in FIG. 7. Tensioning pulley 140, of course, moves inwardly toward the Vee bearing against the bias of spring reel 144 to accommodate the changed belt configuration. Inasmuch as drill motor 120 is constantly running and drive belt 124 constantly recirculating, the tool supported in the Vee bearing will commence high speed rotation as soon as the drive belt is trained around its drive pulley.

With a drill 166 rotating in position on Vee bearing 14 the same may be infed, as desired, under the control of a conventional manual manipulator assembly 18 such as that utilized in the Model 1M microdrilling machine manufactured by National Jet Company, Cumberland, Maryland and described in National Jet Company's Technical Bulletin M1-168. The operating lever 170 of the manipulator assembly coacts with an adjustable micrometer depthing device herein illustrated as an indexable plate 172 having a plurality of adjustable stops 174 against which lever 170 bottoms to accurately preestablish hole depth. Drill placement rack 134 is generally rectangular in front elevation and presents aligned pairs of tool holding recesses 176 which support the spindles 178 of tools 166 adjacent their remote ends. Recesses 176 are fitted with similarly shaped permanent magnets 180 to retain the rack supported tools firmly in place until they are positively removed by engagement with the Vee bearing as the placement rack moves rearward relative thereto as described above. The spacing between the sides of rack 134 just exceeds the height of Vee bearing 14 to accommodate the aforesaid relative movement. Tool guides 182 engage the undersurfaces of drive pulleys 168 when the drills are positioned in the rack to preclude any possibility of the drill pulley getting out of the plane of recirculating drive belt 124 by downward movement of the drill.

The drill placement rack, while being reciprocal in the fore and aft direction under the influence of air motor 154, is constrained against reaching the full extent of forward movement attained by the remainder of the rack positioner assembly. Stated differently, the tool positioner assembly moves forward together upon extension of air motor 154 but the forward travel of the placement rack is terminated just short of the full extending movement of the remainder of the assembly. The purpose of this small amount of relative movement is to clear the working drill pulley from contact with the drive belt during the tool interchange operation so that the placement rack may be shifted transversely to bring a new tool into position in alignment with the Vee bearing without the rack supported tools engaging either the drive belt or idlers 142. The foregoing is achieved by mounting the placement rack track in feet 184 of brackets 186 to which brackets are rigidly secured spring stop blocks 188 and shafts 190. Brackets 186 and feet 184 are mounted for slight reciprocal movement relative to track extensions 191 extending forwardly of and integrally formed with the main frame of the positioner assembly. The extent of relative movement between feet 184 and track extensions 191 is clearly evident from a comparative examination of FIGS. 5 and 6. Linear bearing assemblies 192, mounted on brackets forming part of the positioner assembly, support shafts 190 for linear movement relative thereto. Arms 194 are rigid with shafts 190 and are positioned to engage stop blocks 196 at their forwardmost extent of travel.

Following energization of air motor 154 the whole positioner assembly, including shafts 190, moves forwardly until arms 194 strike blocks 196. At this time, shafts 190 and the drill rack track and drill placement rack supported thereby are blocked against further movement and further extension of air motor 154 moves the remainder of the assembly excluding bracket 186 and the placement rack track forwardly to the position of FIG. 6 relative to track extensions 191 against the bias of springs 198. This further forward movement of the positioner assembly relative to the placement rack results in moving the fork structure 136 and its two rear idlers 142 forward of the forwardmost extent of the drill drive pulley which was last in working position in the Vee bearing thus clearing the tool, which is now held in its supporting recesses in the placement rack, for transverse movement when rack motor 160 is energized. This is the tool change position and is the one illustrated in FIG. 8.

CONTROL CIRCUITRY

Figure 4:
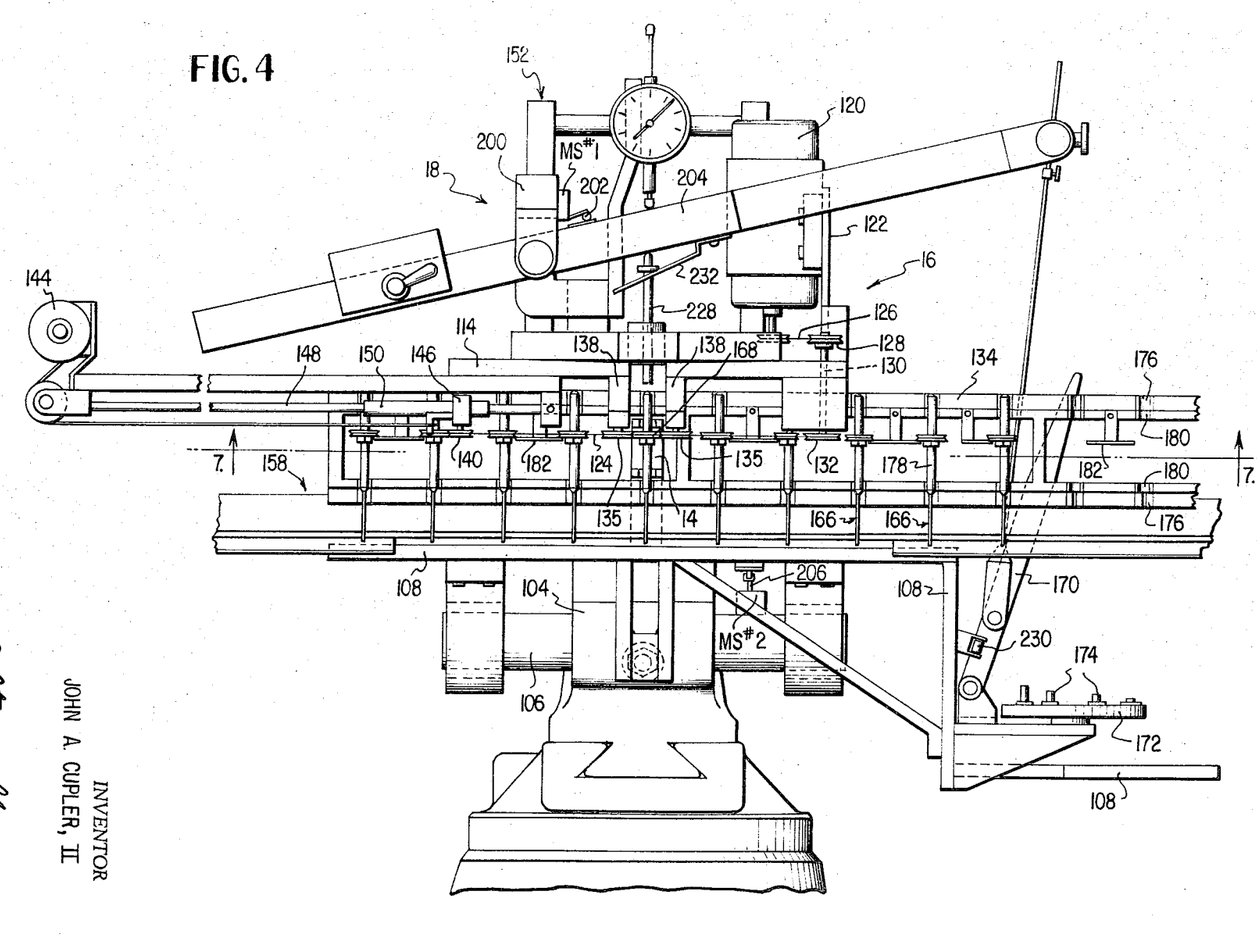
FIG. 4 is a broken front elevational view of the tool change table and its supported structure.

The functions of the various microswitches and handswitches will be apparent from an inspection of the electrical schematic shown in FIG. 9 and the physical placement of the same will be described prior to a detailed description of the circuitry controlled thereby. Microswitch (M.S.) No. 1 is a safety switch which is mounted on a fixed bracket 200 of the manual tool infeeding mechanism and whose actuating arm 202 engages lever 204 of the manual manipulator. Neither of the air motors 151, 154 may be activated until M.S. No. 1 is closed by the positioning of lever 204 in the uppermost position shown in FIG. 4 which is the drill retract position. This insures that a drill interchange may not be initiated with the bearing supported tool in any position other than the drill retract position with its drive pulley lying in the plane of the tool drive belt 124. M.S. No. 1 provides a further safety feature for the operator who will be manually manipulating lever 170 and might be injured by the unexpected initiation of a tool change cycle.

M.S. No. 2 is rigidly mounted on shaft 106 (FIG. 4) with its actuating arm 206 in position to be engaged by a lower surface of tool change table 108 as it undergoes its pivotal movement about the axis of shaft 106. Normally closed M.S. No. 2 is held in the open position by the depression of actuating arm 206 engaging the undersurface of the tool change table in all positions of the table except when it is tilted fully back by the retraction of air motor 151. After table 108 is tilted fully back, M.S. No. 2 closes and completes the circuit to solenoid air valve 208 of air motor 154. Thus, M.S. No. 2 is a sequence demanding safety switch in that it insures that the tool positioning assembly may not be extended until the table is elevated away from the work station and the operator.

Because of the great importance of the sequence demanding circuit in precluding breakage of tools and injury to personnel, a second sequence demanding circuit is utilized as a fail-safe feature and includes a normally open M.S. No. 3 fixedly mounted on the Bridgeport cross-arm by a bracket 210 and having its actuating arm 212 positioned to be engaged by an abutment 214 carried by the table as shown in FIG. 5. M.S. No. 3 controls a solenoid operated air check valve 216 which precludes the admission of pressurized air to air motor 154 until M.S. No. 3 is closed by rearward tilting movement of the table.

Handswitch (H.S.) No. 1 on control panel 218 controls the operation of motor 220 driving a coolant pump, not shown, to recirculate coolant from a suitable reservoir, not shown, onto the workpiece from whence it falls into the work station coolant receptacle 36 and is returned to the reservoir.

H.S. No. 2 controls the operation of a motor 222 driving a vacuum pump, not shown, which functions to prime the coolant pump.

H.S. No. 3 is the manual control for drill motor 120 which, it will be recalled, is normally running at all times during the operation of the machining center.

H.S. No. 4 is the function complete switch which is momentarily depressed at the completion of one work cycle at a particular location on the workpiece. The completion of the function complete circuit energizes the appropriate circuit in numerical control unit 20 to advance a new tape block into position which controls the positioning of the workpiece to present a new work location and to control the transverse movement of the drill placement rack during the working cycle at the new work location. More specifically, after the completion of a work cycle at one working location wherein any number of preprogrammed tools 166 may have performed machining operations, the rack is raised and extended either by the manual depression of lift switch 224 or in a preprogrammed manner dictated by the particular tape block in control position in the numerical control unit 20. Thereafter H.S. No. 4 is depressed and a new tape block is advanced, in known manner in the numerical control unit, to control the positioning of the workpiece for the next machining cycle at a particular preprogrammed work location. Following the depression of H.S. No. 4 and the advancement of a new tape block any or all of the work positioning motors 48, 66, 86, 94, 100 are energized to reposition the workpiece while rack placement motor 160 is energized to reposition placement rack 134 to bring the first tool into machining position simultaneously with the repositioning of the workpiece. Alternatively, rack motor 160 may be controlled, manually, by the depression of a manual switch on the numerical control unit, if desired, to complete the placement rack motor circuit. Similarly, rack motor 160 may be either preprogrammed to shift the tool placement rack during each tool change cycle as indicated schematically in FIG. 9 or the circuit may be closed manually by an operator to initiate a precise linear translation of the rack.

The numerical control tape controls the set of electric brakes 42, 62 when the workpiece is in the desired machining position and releases either or both the brakes when the workpiece is to be repositioned following the advancement of a new tape block. H.S. No. 5 is a manual over-ride in the event manual adjustments of the workpiece position are desired. Thus, normally, H.S. No. 5 is left in the closed position so that brakes 42 and 62 are set except as over-ridden by the tape control.

MACHINING OPERATIONS

The operation of the machining center to perform machining operations as opposed to combined machining and assembly operations will now be described with reference to FIGS. 1–9.

A particularly advantageous utilization of the machining center is in the drilling of fluid cooling holes in gas turbine blades and vanes utilizing the progressive step tool change principles fully enumerated in applicant's copending application Ser. No. 786,344 filed Dec. 23, 1968. In that application is disclosed a method of drilling a single hole involving the use of a plurality of different drills which are sequentially interchanged and infed along a common centerline as has been previously explained. Following the completion of one of such holes, the workpiece must be repositioned to present a new work location to be drilled in the same manner and the procedure is repeated until the requisite number of holes are drilled. Upon reference to the last named copending application a clear exposition of the difficulties involved in the drilling of multiple holes at varying angles to multiple compound surfaces of curvature will be found and the necessity for virtual infinite workpiece positioning control as well as an extremely rapid tool interchange will be evident.

Assume, for purposes of explanation, that 10 different drills or tools 166 are to be utilized in the formation of a single hole in turbine vane 28.

A rack 134, which may be detached from the machining center, has positioned in 10 of the recesses 176 the 10 tools that will be utilized to drill each of the holes. The tools are retained in their recesses by magnets 180. It will be apparent that by the utilization of several tool placement racks 134, the tools carried thereby may be either replaced or sharpened while another rack of tools is being utilized on the machining center. Thus, if the machining center had a previous rack of tools thereon, placement rack motor 160 would be manually energized to drive the rack fully to one end of its travel by pinion 162 after which time the rack would be removed and replaced by the new rack containing the 10 selected tools. During this rack change operation, the tool change table 108 is in the upwardly tilted position and the tool rack positioner assembly 114 in the extended position shown in FIGS. 6 and 8. Assuming that H.S. No. 4 has been previously depressed to indicate the completion of the previous cycle and advance the next tape block in numerical control unit 20, the new rack will be driven, by motor 160, to position the first of the 10 tools in alignment with bearing 14 after which time the tool positioner assembly is retracted and lowered by the momentary depression of "lower" switch 226. The retraction of the tool positioner assembly results in positioning the selected tool in bearing 14 thus entraining drive belt 124 about tool spindle pulley 168 and rotation of the selected tool all in the manner previously explained. The workpiece 14 has also been repositioned to present a new work location and the operator may now commence the machining of one hole in the workpiece.

Clockwise movement of handle 170 by the operator results in the clockwise movement of arm 204 to force follower 228 downwardly against the upper end of tool spindle 178 positioned in Vee bearing 14. The operator manipulates handle 170 downwardly in an oscillating manner to facilitate chip removal and retard tool fatigue until handle 170 bottoms on the selected stop 174 representing the hole depth to be drilled by the first tool. Thereafter, handle 170 is moved counterclockwise to the position of FIG. 4 where it is held by spring clip 230. Tool 166 is retracted to the position of FIG. 4 under the bias of extensible drive belt 124 and follower 228 is raised with arm 204 by leaf spring 232.

With arm 204 in the upper position, M.S. No. 1 is closed to permit energization of air motor 151 by depression of "lift" switch 224. Depression of switch 224 tilts table 108 rearwardly to the position of FIG. 6 closing M.S. No. 2 and M.S. No. 3 whereupon air motor 154 is energized to extend the rack positioner assembly to the position of FIG. 6 thus shifting rack 134 forwardly relative to bearing 14 from the position of FIG. 7 to the position of FIG. 8. In the FIG. 8 position, the first working tool is again held in its rack position in a pair of recesses 176 by magnets 180 and air motor 160 is energized to shift the rack and bring a second tool into alignment with bearing 14. Thereafter, "lower" switch 226 is depressed to retract and lower the drill placement assembly which results in drive belt entrainment of the second tool spindle pulley and its rotation in position to perform a subsequent machining operation. After all 10 tools have, in like manner, performed their assigned machining operation along a common centerline, the function complete circuit is energized to advance a new tape block which then energizes the appropriate work positioning motors to reposition the workpiece and present a new machining location to be drilled by the 10 tools in a manner similar to that just described.

COMBINED MACHINING AND ASSEMBLY OPERATIONS

Figure 10:
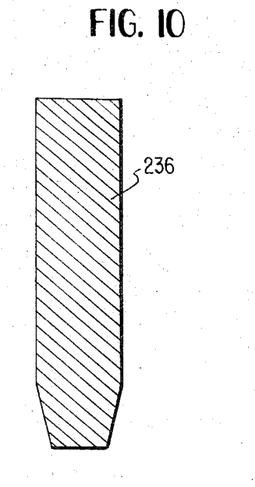
FIGS. 10–16 schematically illustrate various stages in the formation of a ball point nib which may be performed with the machining center disclosed herein.
Figure 16:
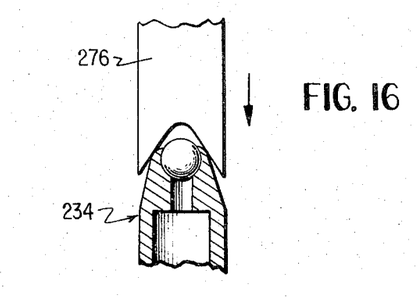
Figure 20:
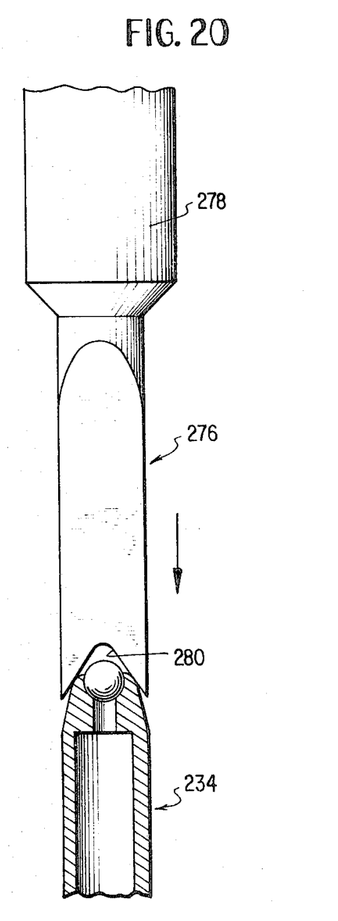
FIG. 20 is a broken view, partly in elevation and partly in section, of a final assembly operation employing a spinning tool.

The extremely short time intervals involved in a tool change cycle coupled with the infinitely variable preprogrammed work positioner makes possible, for the first time, the extension of automatic tool changer principles to combined machining and assembly operations. The manner in which the concepts herein disclosed, and particularly the cooperation between a non-captive bearing and non-captive tool supports, may be advantageously utilized in a series of combined machining and assembly operations that have previously necessitated the use of separate machines and workpiece transfer therebetween will be apparent from an inspection of FIGS. 10–16. In FIGS. 16 and 20 is illustrated a completed ball point pen subassembly, or writing nib 234 which may be manufactured from the blank 236 shown in FIG. 10. The nib blank is in the form of a tapered rod which, as will become apparent from the ensuing description, will be machined from opposite ends thereof and undergo assembly operations; all at the same work station, along the same centerline and under the influence of the same infeed element. In combined machining and assembly operations of the particular type herein described wherein such operations are carried out at opposite ends of the workpiece the drain receptacle is made sufficiently large to readily accommodate 360° rotation of work holder 30 about axis 46 to present opposite ends of the nib blank, which may extend above and below work holder 30, in working position beneath the working axis of bearing 14. The nib blank may be secured in work holder 30 in any desired manner such as by resilient surfaced jaws or the like.

Figure 11:
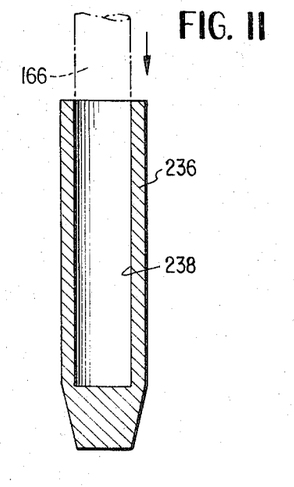
Figure 12:
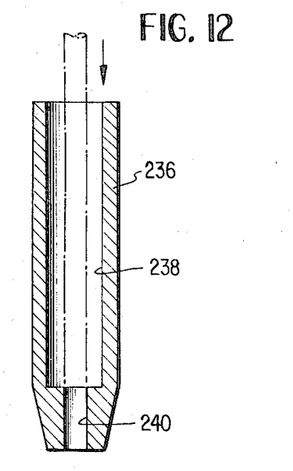
Figure 13:
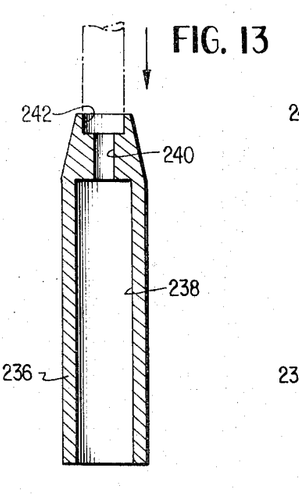
Figures 14, 15:
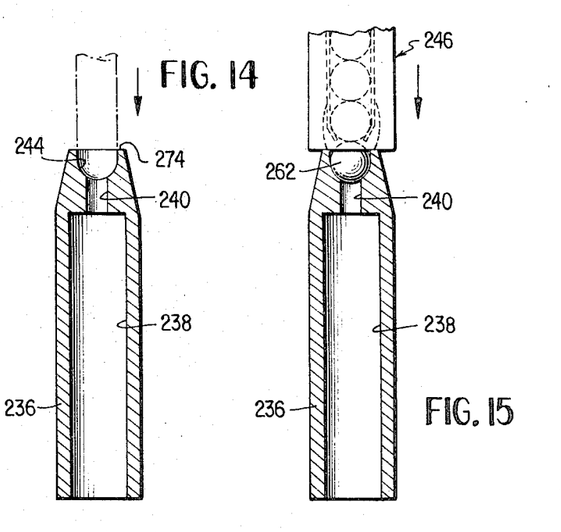

Nib blank 236 is first secured in work holder 30 with the untapered end facing upwardly. A first machining operation with a tool 166 is performed to machine blind bore 238, as shown in FIG. 11, which will subsequently become the ink reservoir. A tool interchange is then initiated to position a second smaller diameter drill in working position on bearing 14 while the work holder is held stationary. The smaller diameter drill is then infed to form a small through bore 240 concentrically through the tapered end of the nib blank. Work holder 30 is then rotated 180° about axis 46, a third tool is interchanged with the second tool on bearing 14 and infed to form blind counter bore 242, as shown in FIG. 13. A fourth tool in the form of a radius end drill is then interchanged with the third tool on bearing 14 and infed to form the hemispherical ball seat 244 at the end of counter bore 242 and centrally intersected by through bore 240. The through bore 240 will subsequently feed the ink from the reservoir to the hemispherical ball seat. The aforedescribed machining operations involving one work repositioning step have prepared the nib blank for two final assembly steps to produce a finished nib and such further steps do not require repositioning of the workpiece.

Figure 17:
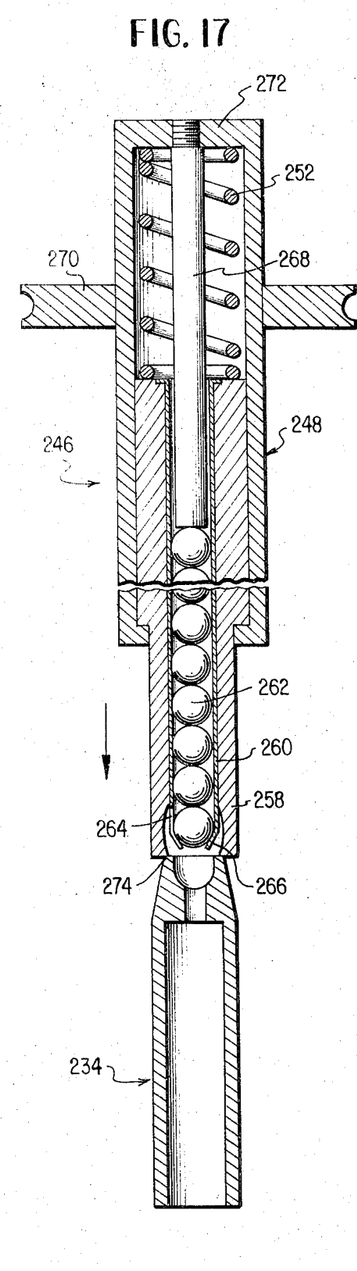
FIGS. 17 and 18 are sectional elevations of a ball assembly tool in different stages of operation.

Two assembly tools especially designed for use with an automatic tool changer employing non-captive tools are shown in FIGS. 17 and 20. The ball placement tool 246, shown in FIGS. 17 and 18, includes telescopically related ball retaining and dispensing elements 248, 250, respectively. A relatively strong compression spring 252 urges elements 248 and 250 to their outer limit of telescopic extension as defined by the engagement of shoulders 254, 256. The inner telescoping, or ball retaining, member consists of a centrally bored plug 258 having a spring steel or other type resilient sleeve 260 press-fitted within the bore thereof. Sleeve 260 has an internal diameter slightly larger than the diameters of balls 262 which are to be assembled with, and constitute a part of, the finished nib. Sleeve 260 may be coextensive in length with plug 258 and the sleeve end adjacent the outer end of the plug is slit, as shown at 264 in FIGS. 17–19, and tapered inwardly to define a lower sleeve opening having a lesser diameter than the diameters of balls 262. Slits 264 form, in effect, three convergent resilient fingers 266 which may be flexed outwardly into engagement with a recess in the wall of the plug bore to permit a ball to pass through the lower end of sleeve 260. Plunger 268, formed integrally with the outer telescoping or ball dispensing member 248 extends downwardly into sleeve 260. It will be thus apparent that inward telescoping movement of plug 258 relative to outer element 248 will result in one or more of balls 262 stacked in sleeve 260, being expelled through the lower end thereof with the resilient fingers 266 springing back into their convergent ball retaining position after the expulsion of each ball. It will be further apparent that the concentricity of all parts involved in ball placement tool 246 makes it possible for the same to be rotated by drive belt 124 driving through pulley 270 secured to outer telescoping member 248. Although there is no advantage, per se, in rotating the ball placement tool there is a very great advantage in being able to rotate the tool without disadvantage since it permits the assembly step to be carried out in the absence of any alteration whatsoever of the normal operating cycle of the machining center. For instance, it would be entirely feasible to program the drive belt motor 120 to stop as a function of the placement of the assembly tool in working position which is precisely the operational mode contemplated when using an assembly tool which cannot be rotated; however, the fact that the recirculation of drive belt 124 need not be arrested greatly simplifies the programming of the Icon controller and retains for the machining center one of its greatest advantages arising from the use of non-captive bearings, viz. that the tool driving means need not be arrested during a tool interchange cycle.

Figure 18:
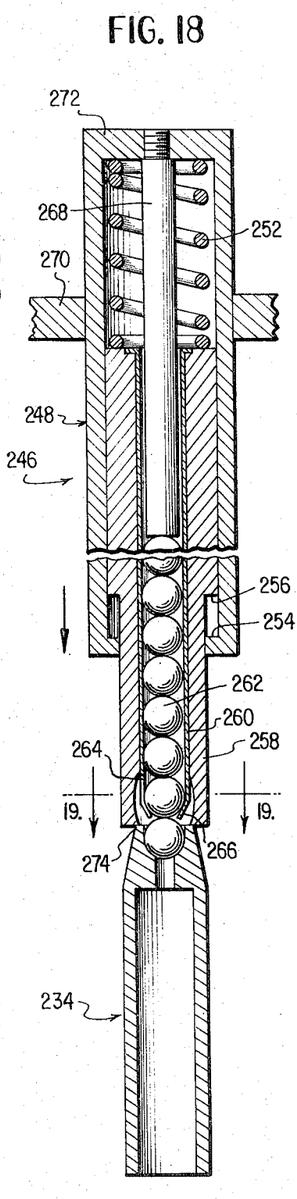
Figure 19:
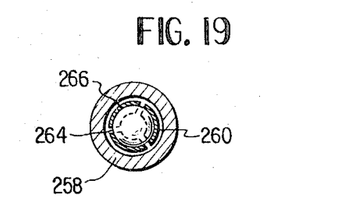
FIG. 19 is a sectional view taken along line 19—19 of FIG. 18.

The manner in which a single ball may be expelled from the ball placement tool 246 merely by manipulation of the manual tool infeed linkage will be readily apparent from an inspection of FIGS. 17 and 18 wherein the ball placement tool is schematically illustrated in that position wherein it is supported in Vee bearing 14 and either the outer member 248 or the whole tool is rotating under the influence of the drive belt engaging pulley 270. In the position of FIG. 17, the manual tool infeed linkage has been manipulated to force follower 228 downwardly against upper surface 272 of ball placement tool 246 resulting in downward movement of the whole tool, due to the bias of compression spring 252, until the lower end of plug 258 engages the upper surface of the machined nib blank with sleeve 260 and the stack of balls 262 in alignment with hemispherical seat 244. This is the position illustrated in FIG. 17. As further clockwise movement is imparted to handle 170 of the manual linkage, follower 228 forces outer ball ejecting member 248 downwardly relative to the inner ball retaining member against the bias of spring 252 and plunger 268 acting against the upper ball 262 and the stack of balls thereunder forces the lower ball through resilient fingers 266 and onto seat 244 as shown in FIG. 18. Further downward movement of the outer ball dispensing member is, of course, impossible since the solid stack of balls is bottomed in seat 244. After passage of the lowermost ball from the ball dispensing tool, resilient fingers 266 reassume their convergent relationship to retain the remainder of the ball stack pending a subsequent assembly operation.

The formation of nib 234 is now complete except for a spinning or swaging operation to spin or swage lips 274 inwardly to retain the ball and this subsequent assembly step is performed by the spinning tool shown in FIGS. 16 and 20 which is next interchanged with the ball dispensing tool on bearing 14 in the manner previously explained in connection with tools 166.

Spinning tool 276 includes a spindle portion 278 including a driving pulley, not shown, and a generally conically shaped female working end 280 dimensioned to engage and deform lips 274 of nib 234 inwardly to the position shown in FIGS. 16 and 20 upon downward movement of the same as transmitted by follower 228 from the manual operating linkage.

It will thus be appreciated that combined machining and assembly operations may be carried out utilizing a single piece of equipment in the form of a tool changer employing non-captive tools which tool changer requires no modification to convert the same from a pure machining center; it merely being necessary to substitute assembly tools for certain of the machining tools which assembly tools require only the precise same power input as provided for the machining tools, i.e. rotation and linear infeed.

When using the machining center either for pure machining purposes or combined assembly and machining operations, it is entirely feasible, and in many cases desirable, to utilize a modified form of drill placement rack in the nature of an endless flexible tool holder. Such endless tool holder may comprise recessed blanks suitably secured to spaced sprocket chain links which links recirculate and form an endless tool holder positioned on suitable sprockets generally surrounding the tool change and driving mechanism. One advantage in this arrangement is the increased number of tools that may be employed without the necessity of substituting rigid racks 134.

Although the invention has been illustrated with a single bearing 14 it is apparent that a plurality of such bearings may be utilized and plural tools interchanged between the support rack and bearings in accordance with the general principles outlined in the aforesaid application Ser. No. 715,711.

The numerical control unit 20 may constitute the commercially available Icon Numerical Control, Model No. 350–33 manufactured by the Icon Corporation, Cambridge, Massachusetts.

The pulse or stepper motors disclosed herein may be the commercially available Electric Pulse Motor, Model No. E-73011 manufactured by Fujitsu Ltd., Japan and distributed in the United States by the Icon Corporation, Cambridge, Massachusetts.

I claim:

1. In an automatic tool changer for performing a plurality of machining operations at each of plurality of work locations on a single work piece, the combination comprising: an open bearing, fixed at least during said machining operations, defining a vertical working axis for a machining tool; means for supporting said work piece in intersecting relationship to said axis and for three dimensional movement relative to said bearing; means for supporting, in a generally vertical position, a plurality of machining tools adjacent said bearing; and means for imparting three dimensional movement to one of said tools relative to said bearing including means for infeeding said one tool along said working axis.

2. The tool changer of claim 1 wherein said means for supporting said workpiece includes a plurality of power transmitting means for imparting a like plurality of adjustments to said workpiece.

3. The tool changer of claim 2 wherein said plurality of adjustments include rotary adjustments about mutually perpendicular axes.

4. The tool changer of claim 2 including at least five distinct power transmitting means.

5. The tool changer of claim 2 including at least eight distinct power transmitting means.

6. The tool changer of claim 1 wherein said means for supporting a plurality of machining tools includes non-captive tool supports defined by support structure engaging substantially less than the total periphery of said tools whereby the same may be bodily translated transversely of their own axes into and out of supporting engagement with said support structure.

7. In an automatic tool changer for performing a plurality of machining operations at each of a plurality of work locations on a single workpiece, the combination comprising: a bearing, fixed at least during said machining operations, defining a working axis for a machining tool; means for supporting said workpiece in intersecting relationship to said axis and for three dimensional movement relative to said bearing; means for supporting a plurality of machining tools, having a magnetically attractive portion, adjacent said bearing, said support means including aligned pairs of recesses and magnetic means acting in conjunction with said recesses and said magnetically attractive tool portions for retaining said tools in said recesses, and means for imparting three dimensional movement to one of said tools relative to said bearing.

8. The tool changer of claim 7 wherein said last named means provides a substantially vertical support for said tools.

9. The tool changer of claim 8 wherein said bearing is an open bearing and said working axis is substantially vertical.

10. The tool changer of claim 8 wherein said recesses are semi-cylindrical.

11. The tool changer of claim 1 wherein said last named means includes motor means for imparting movement to said one of said tools in at least two dimensions.

12. The tool changer of claim 11 wherein said infeeding means includes manual manipulating means for imparting movement to said tool in one direction.

13. In an automatic tool changer for performing a plurality of machining operations at each of a plurality of work locations on a single workpiece, the combination comprising: a bearing, fixed at least during said machining operations, defining a working axis for a machining tool; means for supporting said workpiece in intersecting relationship to said axis for at least five distinct workpiece adjustments relative to said bearing; said five distinct adjustments including infinite rotational adjustment about mutually perpendicular axes and three dimensional linear adjustment; at least five distinct power transmitting means for effecting said adjustments; means for supporting a plurality of machining tools adjacent said bearing; means for imparting three dimensional movement to one of said tools relative to said bearing and means for rotating said one tool including means for biasing said one tool along said working axis in a direction away from said workpiece.

14. The tool changer of claim 1 wherein said workpiece supporting means includes first means mounting said workpiece for coarse three dimensional movement relative to said bearing and second means, carried by said first means, mounting said workpiece for fine three dimensional movement relative to said bearing.

* * * * *